(12) United States Patent
Fortmann (10) Patent No.: US 8,390,139 B2
(45) Date of Patent: Mar. 5, 2013

(54) WIND ENERGY INSTALLATION HAVING CONVERTER CONTROL

(75) Inventor: Jens Fortmann, Berlin (DE)

(73) Assignee: REpower Systems AG, Hamburg (DE)

(*) Notice: Subject to any disclaimer, the term of this patent is extended or adjusted under 35 U.S.C. 154(b) by 264 days.

(21) Appl. No.: 12/735,852

(22) PCT Filed: Feb. 18, 2009

(86) PCT No.: PCT/EP2009/001140
§ 371 (c)(1),
(2), (4) Date: Aug. 20, 2010

(87) PCT Pub. No.: WO2009/103505
PCT Pub. Date: Aug. 27, 2009

(65) Prior Publication Data
US 2010/0327584 A1 Dec. 30, 2010

(30) Foreign Application Priority Data

Feb. 20, 2008 (DE) .................. 10 2008 010 260
Jul. 24, 2008 (DE) .................. 10 2008 034 532

(51) Int. Cl.
*F03D 9/00* (2006.01)
(52) U.S. Cl. .................................... 290/44; 290/55
(58) Field of Classification Search .............. 290/44, 290/55
See application file for complete search history.

(56) References Cited

U.S. PATENT DOCUMENTS

| | | | | |
|---|---|---|---|---|
| 5,652,485 A * | 7/1997 | Spiegel et al. | ................ | 318/147 |
| 7,180,270 B2 * | 2/2007 | Rufer et al. | ..................... | 322/20 |
| 7,268,443 B2 * | 9/2007 | Kikuchi et al. | ................. | 290/44 |
| 7,830,127 B2 * | 11/2010 | Corcelles Pereira et al. | ... | 322/24 |
| 2003/0214823 A1 * | 11/2003 | Kawazoe et al. | ............... | 363/37 |
| 2007/0121354 A1 * | 5/2007 | Jones et al. | ..................... | 363/47 |
| 2010/0320762 A1 * | 12/2010 | Letas et al. | ...................... | 290/44 |

FOREIGN PATENT DOCUMENTS

DE 10 2007 028 582 12/2007

OTHER PUBLICATIONS

Bueno, E. et al. "Optimized Design of a Back-To-Back NPC Converter to Be Used As Interface for Renewable Energies," 31$^{st}$ Annual Conference of IEEE, Piscataway, NJ, Nov. 6, 2005: 2543-2548.
International Search Report mailed Aug. 28, 2009, directed to counterpart application No. PCT/EP2009/001140; 6 pages.

* cited by examiner

*Primary Examiner* — Tho D Ta
(74) *Attorney, Agent, or Firm* — Morrison & Foerster LLP (57) ABSTRACT

A method for controlling a converter of a wind energy installation. The converter is connected to a rotor of a doubly-fed asynchronous generator for feeding electrical power into an electrical grid and comprises a generator-side inverter, a grid-side inverter, and at least one converter regulator for regulating and/or controlling currents emitted from at least one of the inverters to at least one of the generator and the electrical grid. The method includes detecting a change in electrical voltage present in at least one of emitted real currents and emitted reactive currents at one of the inverters, determining whether the detected change corresponds to a predetermined change, and changing nominal values of at least one of real currents to be emitted and reactive currents to be emitted from the other inverter if the detected change corresponds to the predetermined change.

18 Claims, 4 Drawing Sheets

WIND ENERGY INSTALLATION HAVING CONVERTER CONTROL

REFERENCE TO RELATED APPLICATIONS

This application is a national stage application under 35 USC 371 of International Application No. PCT/EP2009/001140, filed Feb. 18, 2009, which claims the priority of German Patent Application Nos. 10 2008 010 260.1, filed Feb. 20, 2008, and 10 2008 034 532.6, filed Jul. 24, 2008, the contents of which prior applications are incorporated herein by reference.

FIELD OF THE INVENTION

The invention relates to a converter of a wind energy installation, which converter is connected to the rotor of a doubly-fed asynchronous generator for feeding electrical power into an electrical grid, with the converter having a generator-side inverter and a grid-side inverter, and to a method for controlling the converter.

BACKGROUND OF THE INVENTION

Frequency converters are being increasingly used for wind energy installations. Modern wind energy installations normally have a variable rotation speed, as a result of which the generator produces alternating current at a different frequency. Frequency conversion is necessary for feeding into a fixed-frequency supply grid (normally 50 Hz). Frequency converters are used for this purpose. In this case, it is preferable to use converters which consist of a generator-side inverter which is electrically connected to the rotor of the generator, a DC voltage intermediate circuit and a grid-side inverter which is electrically connected to the grid. Wind energy installations have normally been operated such that they are disconnected from the grid in the event of grid faults, in particular short circuits. With the increasingly widespread use of wind energy installations and the increase in the installed wind power, the requirement is, however, no longer simply for real current to be fed into the electrical grid, but it is desirable for the wind energy installations to be operated to support the grid voltage. In the case of the doubly-fed asynchronous generators which are preferably used for relatively high power wind energy installations, one problem that arises is that the grid-feeding inverters are designed for only about ⅓ of the electrical power and it is now no longer possible to achieve the additionally required currents in order to ensure grid-supporting characteristics.

DE 10 2007 028 582 A1 has proposed that, for a generator with a full converter, in which the entire electrical power is fed via the converter into the electrical grid, the generator-side inverter should likewise be connected directly to the grid when the generator is no longer generating energy, in order to feed additional reactive power into the grid via the generator-side inverter which is then connected directly to the grid.

This solution has the disadvantage that it can be used only when the generator rotor is not emitting any power.

SUMMARY OF THE INVENTION

The object of the present invention is to avoid the above-mentioned disadvantages, to prevent excessive loads on the inverters, and to make better use of the inverter margins that are available.

The solution according to the invention comprises a method and apparatus according to the features broadly disclosed herein, and advantageous developments are described in the disclosure below.

In the case of the method according to the invention, when controlling a converter of a wind energy installation, which converter is connected to the rotor of a doubly-fed asynchronous generator for feeding electrical power into an electrical grid, with the converter having a generator-side inverter, a grid-side inverter and at least one converter regulator for regulating and/or controlling the currents emitted from at least one of the inverters to the generator and/or the electrical grid, the method steps which are carried out are detection of a change in the electrical voltage which is present, in the emitted real currents and/or the emitted reactive currents at an inverter, determination of whether the detected change corresponds to a predetermined change, and changing the nominal values of the real currents to be emitted and/or the reactive currents to be emitted from the other inverter, if the detected change corresponds to a predetermined change.

The invention has identified that the current output and the regulation of a wind power installation with a doubly-fed asynchronous generator can be improved considerably by not operating the two inverters such that they are regulated independently of one another, as in the past, but by matching the regulation of the two inverters to one another so as to optimize the total current output. In the case of a converter with a DC voltage intermediate circuit connected to a doubly-fed asynchronous generator, this means that this converter cannot only influence the real current output or reactive current output of the grid-side inverter by varying the currents flowing via the rotor of the generator, but the generator-side inverter significantly influences the real current or reactive current output by largely independently adjusting the real current and reactive current in the stator, by application of rotor current.

The application of rotor current to the generator-side inverter by means of field-oriented regulation has been described, for example, in Asurdis: "Doppeltgespeister Drehstromgenerator mit Spannungszwischenkreisumrichter im Rotorkreis für Windkraftanlagen" [Doubly-fed polyphase generator with a voltage intermediate-circuit converter in the rotor circuit for wind power installations]; Brunswick TU Dissertation; 1989.

The invention starting point is that the previous control systems either did not have an asynchronous generator, and the real current and reactive current output could therefore be regulated only via the grid-side inverter or, when an asynchronous generator was used, predominantly used the application of rotor current of the generator-side alternator for regulation, without the inverters being matched to one another, which were themselves matched only to their respective input variables of rotor current or intermediate-circuit voltage. The major advantage of matched regulation between the inverters is that, if the operating conditions of a wind energy installation are changing continuously and unpredictably, the inverters can support one another such that, when predetermined changes or events occur on one inverter, which result in the inverter being at a disadvantageous operating point, the other inverter in each case changes its operating point so as to provide load relief. The regulation of the inverters is therefore no longer in each case based only and individually on the electrical grid or the generator, but also follows additional control strategies with the aim of reducing the overall load on the individual inverters.

This results in particular in the avoidance of critical operating points, which could overload the individual converters, and in consequence it will be possible either to design the converters to be smaller, or to operate more efficiently.

A number of terms will be explained in the following text: In this case, the reactive current or real current means not only the current output through the generator stator, generator rotor or the inverters, but also the current drawn.

A change in the real currents or reactive currents and their nominal values means a change in the amplitude or phase angle of the currents with respect to one another or with respect to the voltage which is present in the grid, or some other reference value. In particular, for the generator-side converter, this also means the change in the currents applied to the generator stator. In this case, the generator-side currents are frequently regulated by the converter regulator by means of a mathematical transformation to so-called field-oriented coordinates, for example $i_q$ and $i_d$, and are transformed back to a three-phase system only for driving the inverters.

A predetermined change in the electrical voltage which is present, in the emitted real currents and/or the emitted reactive currents at one of the inverters means, for example, the reaching of a limit value, the rate of change or a sudden change beyond a predetermined value of the respective variables. However, this may also be an event sequence at predetermined time intervals or predetermined functions being carried out by the converter. In this case, the change does not just need to be limited to the voltage or individual currents, but can also be a combination of these variables, for example of the power. In this case, the pre-determined change also need not occur in all three phases at the same time, but can also affect only one or two phases.

In this case, it is preferable to use the method when the predetermined change in the electrical voltage which is present, in the emitted real currents and/or the emitted reactive currents at one of the inverters is the reaching of a predetermined limit value. When a limit value is reached at one inverter, the other inverter can then either take over a portion of the current output and/or can cause the voltage to be changed so as to make it possible to prevent a limit value from being overshot and the inverter from being damaged or disconnected.

The invention also provides for the maximum predeterminable nominal value of the reactive currents to be emitted from the other inverter to be determined taking account of the emitted real currents and a predeterminable control margin of the real currents. The primary task of the inverters is to regulate the real current output, which is itself predetermined by the externally applied environmental conditions of the wind energy installation. In order to ensure this, the real current regulation must always have priority over the reactive current, and an increase in the reactive current at the other inverter must not lead to a reduction in the real current. In addition, however, a predeterminable margin must also be maintained for the real current in order to make it possible to react quickly to changes in the environmental conditions of the wind energy installation. In one preferred development, when the voltage which is present at an inverter reaches an upper limit value, the other inverter increases the reactive current output in order to reduce the voltage which is present at the limited inverter. This is achieved by the other inverter ensuring a reduction in the high voltage, in addition to the limited inverter.

According to one preferred embodiment, the sum of the reactive and/or real currents emitted from the inverters to the electrical grid, and the reactive and/or real powers remain largely unchanged. In this context, largely means a change in the total output of less than or equal to 10%.

This means that, for example, the total output reactive current from the inverters remains unchanged overall, but the reactive current output on the more highly loaded inverter is reduced, and that on the more weakly loaded inverter is increased, as a result of which no change is perceived in the electrical grid, but the converter reduces the peak load on the individual inverters or power strands associated with the inverters. In particular, the converter control can in this case take account of the design limits of the inverters and of the power strands associated with the inverters, and can as far as possible match the current load with respect to the load relative to the design limit in the respective inverters or the power strands associated with them. This has the advantage that, when the electrical components of the wind energy installation are briefly highly or excessively loaded, for example as a result of short circuits in the vicinity of the wind energy installation, the two power strands have the same proportion of the margin, and one-sided excessive overloading can be avoided.

In this context, power strands associated with the inverters means those electrical components which, when seen electrically from the inverter, are located between the inverter and the electrical grid; that is to say depending on the embodiment, for example, for the grid-side inverter the grid inductor, the grid filter, the converter-side tower cables and, depending on the transformer embodiment, the converter-side transformer winding. Depending on the embodiment, for example, for the generator-side inverter, these are the connecting cables to the generator rotor including the rotor tower cable, the generator rotor, the generator stator, the stator-side tower cables and, depending on the transformer embodiment, the generator-side transformer winding.

According to a further preferred embodiment, in the case of a voltage unbalance such that the discrepancy in a voltage which is present at an inverter in one or two phases goes beyond a limit value, the reactive current output of the other inverter is changed such that the voltage unbalance is reduced. This means that, when a change occurs in the form of a sudden voltage change on only one or two phases at one inverter, the other inverter can counteract the voltage unbalance by deliberately feeding in reactive power, preventing damage to the wind energy installation.

According to one particularly preferred embodiment, the converter regulator regulates the reactive currents to be emitted such that, when rapid major changes occur, the inverter which has higher dynamics preferably emits a higher proportion of reactive currents, that is to say also reaches the currents to be emitted more quickly. This invention means that the margin in the control dynamics of the faster inverter which until now has been unused is made use of. In this case, the faster inverter reaches the limits of its maximum rise in the current output, as a result of which at least a portion of the current output is also taken over by the inverter with the lower dynamics. Overall, this results in a considerably better reaction rate of the overall system.

In one preferred development, after reaching the total current, the major proportion of the current output is then also taken over by the inverter with the lower dynamics. This reduces the load of the inverter with the high dynamics, allowing it to be operated such that it can regulate out relatively small changes more quickly.

According to one particularly preferred embodiment, in the case of a converter regulator which comprises an autonomous inverter regulator for each inverter, an adaptation module is provided which transmits the respective relevant nominal values, actual values and/or control errors for the real currents, reactive currents and/or voltages which are present between the inverter regulators.

According to a further aspect of the invention, which may be used for independent protection, the predetermined change is at least one component in the wind energy installation exceeding a predetermined temperature limit value, caused in particular by the real current and/or reactive current output from the inverter, with the component being located directly in the power flow between the inverter and the electrical grid. The current output of the inverter is substantially responsible for heating of those components of the power strands of the respective inverters which carry power. Depending on the embodiment, for example, for the generator-side inverter, these are the connecting cables to the generator rotor, including the rotor tower cable, the generator rotor, the generator stator, the stator-side tower cables and, depending on the transformer embodiment, the generator-side transformer winding of a three-winding transformer. Depending on the embodiment, for example, for the grid-side inverter, these are the grid inductor, the grid filter, the converter-side tower cables and, depending on the transformer embodiment, the converter-side transformer winding of a three-winding transformer. The temperature of the current-carrying components is significantly influenced by the current flowing through them. If a component associated with the inverter now exceeds a predetermined temperature limit value, then the temperature rise can be limited, or the temperature can even be reduced, by reducing the current output from that inverter and by increasing the corresponding current output from the other inverter.

According to one particularly preferred embodiment, one inverter reaches a current limit which is permissible for continuous operation, but feeds an amount of current which is above this current limit. Beyond this event, the predetermined change comprises a predetermined time elapsing or a predetermined temperature limit value being reached in the power strand associated with that inverter. If the predetermined time or the temperature limit value is exceeded, then the inverter which is feeding excessively reduces its current output, and the other inverter increases its current output, in order to at least partially compensate for the current reduction.

For further explanations and advantageous embodiments, reference is made to the descriptions provided for the first aspect of the invention.

The invention furthermore relates to a corresponding wind energy installation having a converter and a doubly-fed asynchronous generator for carrying out the method.

BRIEF DESCRIPTION OF THE DRAWINGS

The invention will be described in the following text by way of example with reference to the attached drawings, based on one advantageous embodiment. Reference is expressly made to the drawings for all of the details according to the invention which are not explained in more detail in the text. In the figures.

DETAILED DESCRIPTION OF THE INVENTION

Figure 1:
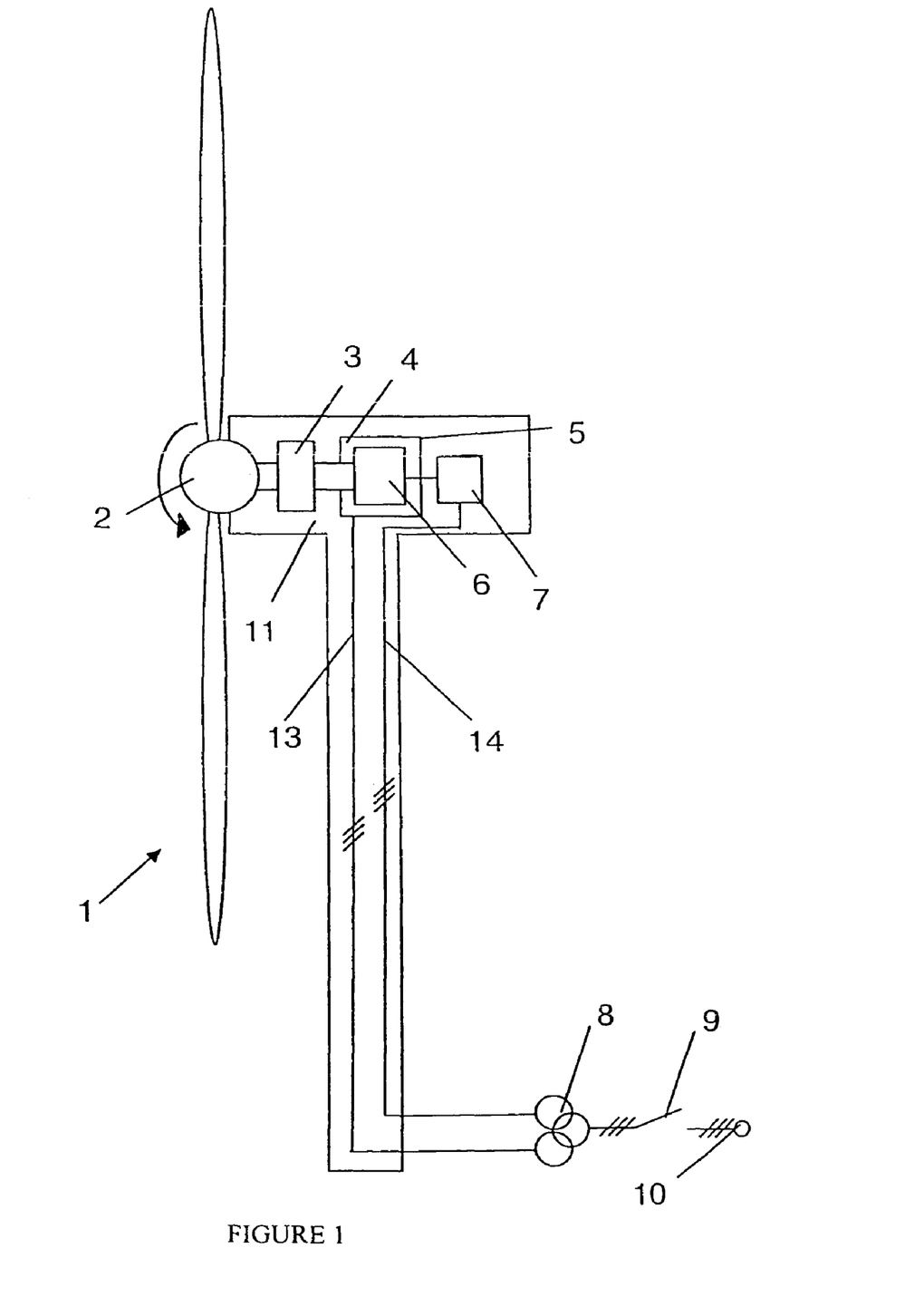
FIG. 1 shows a wind energy installation.

The design of the wind energy installation will be explained briefly with reference to FIG. 1. The wind rotor 2 of the wind energy installation 1 is caused to rotate by the wind. In this case, the wind rotor 2 is mechanically connected to the generator 4 via a gearbox 3, and causes the rotor 6 of the generator 4 to rotate. The stator 5 of the generator is connected to the electrical grid 10 via power cables 13 in the tower, a transformer 8 and a switch disconnector 9. The rotor 6 of the generator 4 is connected to a converter 7 which is in turn connected to the electrical grid 10, likewise via power cables 14 in the tower, a transformer 8 and a switch disconnector 9.

In this case, the transformer 8 is a transformer with three windings, that is to say in each case with separate windings for the power strand of the grid-side inverter 72 and the generator-side inverter 71. Embodiments with two or a different number of windings are likewise feasible. When the generator 4, which is driven by the wind rotor 2, is operated in the region of the rated rotation speed, that is to say in the oversynchronous range, the generator 4 outputs 60-90% of its electrical power, depending on the design, via the stator, an 10-40% of its electrical power via the rotor 6 to the converter 7.

Figure 2:
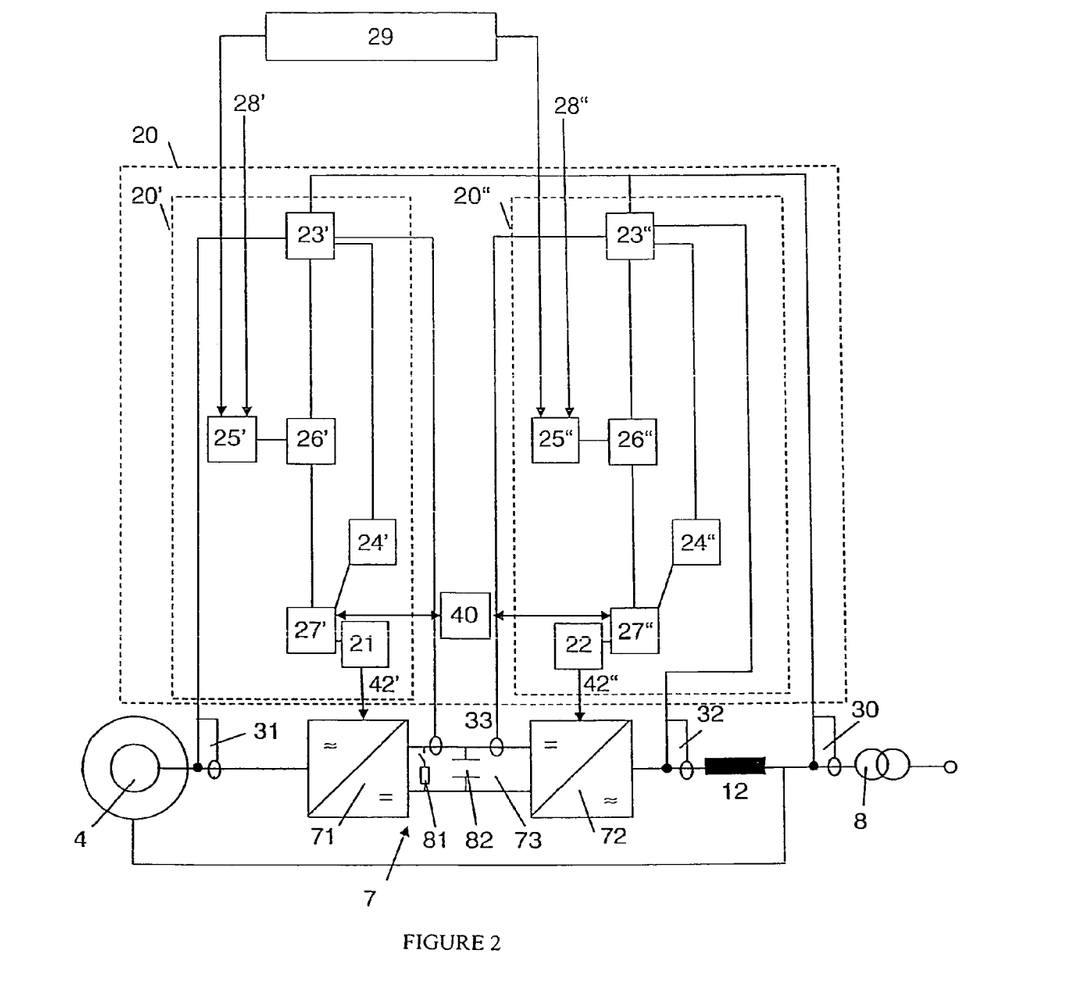
FIG. 2 shows the converter regulator according to the invention.

FIG. 2 shows the converter 7 with a generator-side inverter 71 and a grid-side inverter 72, which are connected via a DC voltage intermediate circuit 73. The grid-side inverter 72 is connected to a transformer 8 via an inductor 12. The generator-side inverter 71 is connected to the rotor 6 of the generator 4, which is itself connected to the transformer 8. In addition to a capacitor 82, the DC voltage intermediate circuit 73 contains a protection element 81 which, in the figure, consists of a switch and a resistor and, when overvoltages occur in the DC voltage intermediate circuit 73, reduces these overvoltages. The protection element 81 may, however, also have different circuit topologies than those shown in FIG. 2.

The converter regulator 20 contains a generator-side converter regulator 20' and a grid-side converter regulator 20", which exchange nominal values, actual values and control errors via an adaptation module 40. Each converter regulator 20', 20" has an inverter regulator 21, 22, which control the switches of the inverters 71, 72 by means of control lines 42' and 42".

The respective electrical variables of the inverters and of the wind energy installation, in particular the voltages which are present and the real and reactive currents which flow and the intermediate-circuit voltage, are measured by means of sensors 30, 31, 32, 33 and are supplied in a measurement module 23', 23" to the converter regulators 20', 20". The measurement module 23', 23" makes the measured values available to a change determining module 24', 24" and to the regulator error module 26', 26". The change determining module 24', 24" uses changes stored in the form of limit values, characteristics or event sequences to determine whether a predetermined change has occurred in the measured values transmitted from the measured value module 23', 23", and the nature of the change. By way of example, this may be the voltage which is present on the grid-side inverter 72 exceeding a limit value or else a reactive current nominal value to be applied which would exceed the maximum permissible current level of the inverter.

Furthermore, the change determining module 24', 24" can also detect predetermined changes in the inverter nominal values before the regulator module 27', 27" applies them to the respective inverter regulators 21, 22. The change determining module 24', 24" passes changes associated with the measured values or inverter nominal values to the regulator module 27', 27".

The nominal value determining module 25', 25" determines the respective power and current nominal values to be output by the wind energy installation and the individual inverters, taking account of the preset values, which are produced by the control system of the wind energy installation 29, and further additional sensor values 28', 28" from the wind energy installation, such as the generator rotation speed, wind speed or component temperatures of the generator, of the converter or of the power lines. The nominal value determining module 25', 25" in this case takes into consideration the torque/rotation-speed characteristics, which differ depending on the operating mode. For example, a different characteristic can be used for noise-optimized operation than for yield-optimized operation. The regulator error module 26', 26" now determines the regulator error between the actual values produced by the measured value module 23', 23" and the nominal values produced by the nominal value module 25', 25", and passes the error found to the regulator module 27', 27".

The regulator module 27', 27" compares the respective regulator errors of the inverters 71, 72 from the nominal values, and passes these to the inverter regulators 21, 22, if the change determining module 24', 24" has not identified a change. However, if the change determining module 14', 24" identifies a predetermined change, the regulator module 27', 27" passes corresponding values to the adaptation module 40, and the other regulator module uses an appropriately stored correction functions to correct the nominal values to be applied to the other inverter regulators 21, 22.

The inverter regulators 21, 22 then control the switches of the respective inverters 71, 72 in accordance with the applied nominal values, as a result of which the appropriate real and/or reactive currents are output.

Figure 3:
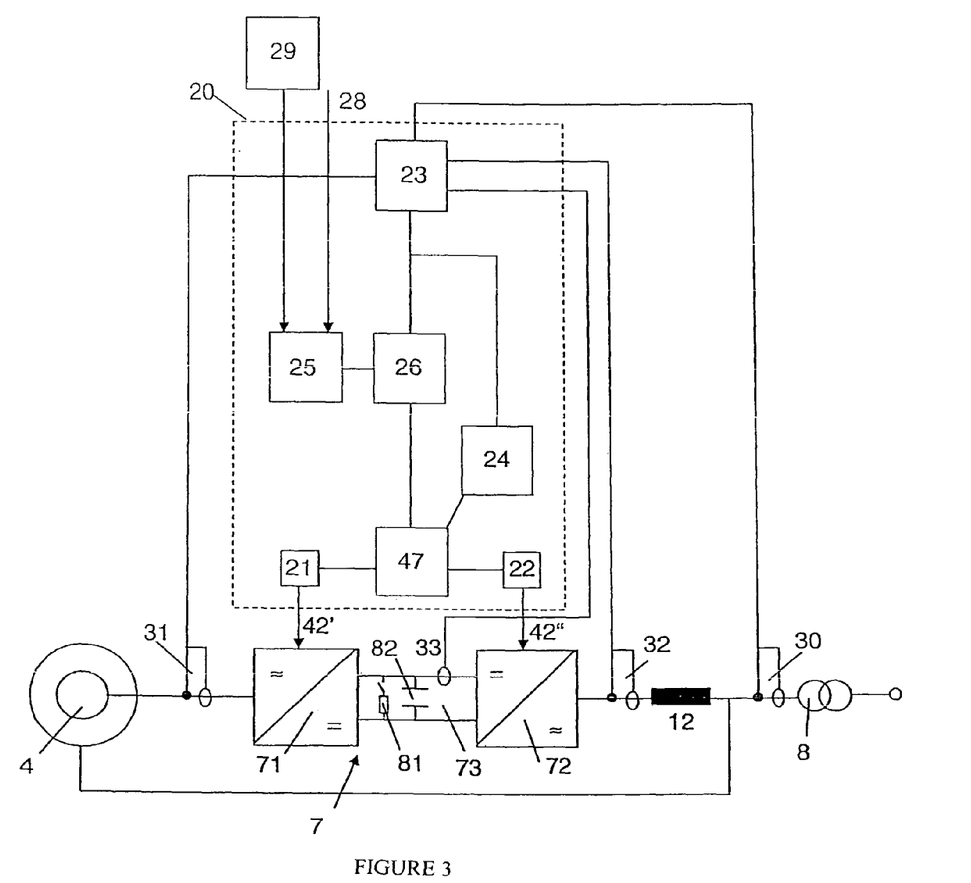
FIG. 3 shows an alternative embodiment of the converter regulator according to the invention.

FIG. 3 shows an alternative refinement of a converter regulator 20 to the regulator structure described in FIG. 2. In this case, the converter regulators 20', 20" are combined in one converter regulator 20. The separate functional modules are likewise combined in a respective corresponding functional module. The regulation process is in this case no longer necessarily separated on the basis of inverters, but the matching between the inverters is in this example carried out only for the nominal value preset of the central regulator module 47 to the inverter regulators 21, 22. The central regulator module 47 combines the functions which, in the case of the exemplary embodiment illustrated in FIG. 2, are carried out by the regulator module 27', 27" and the adaptation module 40. The matching between the inverter regulators 21, 22 is therefore carried out more quickly and more flexibly.

Figure 4:
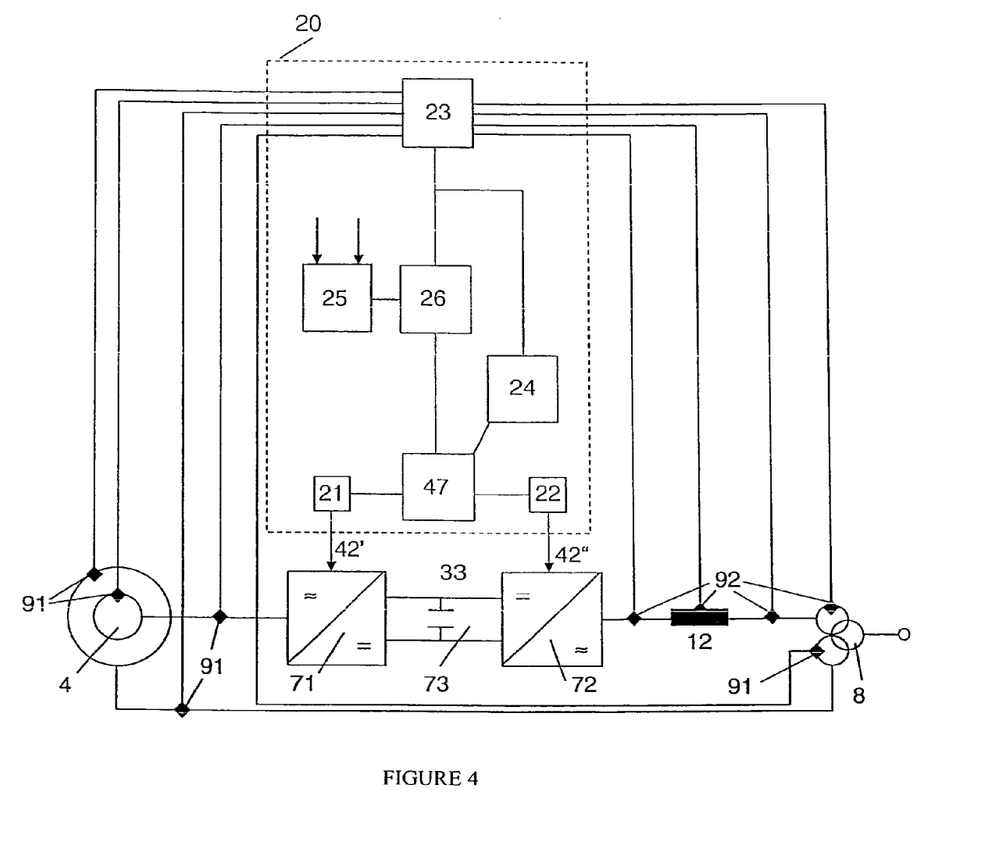
FIG. 4 shows the converter regulator according to the invention with temperature regulation connected.

FIG. 4 shows the converter regulator 20 according to the invention with connected temperature sensors 91, 92. In this case, temperature sensors 91 are provided on the components 4, 8, 13 in the power strand 4, 8, 13 of the generator-side inverter 71 and pass sensed temperature values to the converter regulator 20. Temperature sensors 92 are likewise provided on the components 8, 12, 14 in the power strand 8, 12, 14 of the grid-side inverter 72. If a temperature value exceeds a predetermined temperature limit value, then the converter regulator 20 reduces the current output of the relevant inverter 71, 72, and increases the current output from the other inverter 71, 72 by the same value. This is preferably carried out for the reactive current output.

By way of example, but without being exclusive, the following text explains a number of situations in which the method according to the invention is used, without reference to the figures.

In order to ensure that the grid-side inverter is able to feed power into the grid, the voltage which can be provided by the grid-side inverter must be higher than the voltage on upstream components, such as the inductor. The voltage on the grid-side inverter is in this case governed by the intermediate-circuit voltage and the modulation method used. If the voltage on the upstream components exceeds the voltage which can be provided by the grid-side inverter, then power can no longer be fed into the grid by the inverter, and the inverter is switched off. When the grid voltage is rising, the output of capacitive reactive current (overexcited operation) of the doubly-fed asynchronous generator must therefore be restricted in order to prevent a further rise in the grid voltage.

The method can be optimized such that, when the voltage on the grid-side inverter rises, the voltage in the intermediate circuit is first of all increased to the maximum permissible voltage and, if the voltage on the grid-side inverter rises further, the reactive current output from the grid-side inverter is shifted to the inductive range (voltage-reducing operation), with the aim of limiting the voltage on the grid-side inverter to a maximum permissible value.

The real power output for regulating the intermediate-circuit voltage must not, however, be adversely affected, as a result of which the maximum possible inductive reactive current feed is limited by the remaining reactive current component of the grid-side inverter. The reactive power output to the grid should, however, not be reduced, but should remain the same overall. The capacitive reactive power output from the generator-side inverter is therefore increased, in order to compensate for the reduction from the grid-side inverter. This can mean that the control system for the current output from the generator-side inverter feeds in capacitive reactive current at the stator, while the grid-side inverter outputs inductive reactive current, in order to limit the voltage at the grid-side inverter.

If the permissible voltage limit of the grid-side inverter has still not been reached, the capacitive reactive current output from the generator-side inverter, and therefore from the overall system, is finally reduced until the voltage limit on the grid-side inverter is complied with again.

The magnitude of the current which can be fed into the grid from the grid-side inverter is limited by the design of the switches and the thermal design of the grid-side inverter. For operation of the grid-side inverter, priority must always be given to the real current feed, in order to make it possible to keep the voltage in the intermediate circuit constant. The remaining current can be used for feeding reactive current—minus a certain margin for control processes for real current regulation.

If, during operation, the permissible current feed limit for continuous operation is reached at the grid-side inverter, the reactive current feed from the grid-side inverter is reduced in the direction of zero (independently of whether this is inductive or capacitive). However, in order not to reduce the reactive power which is output from the wind energy installation to the electrical grid, the current output of the stator is controlled by the generator-side inverter such that an increased reactive current is fed into the electrical grid via the stator.

During operation, this method offers the advantage that the maximum available reactive power from the grid-side inverter can always be used, and, if a limit to the current supply capability of the grid-side inverter is reached, the generator-side inverter can take over this feed without any overall reduction in the reactive power feed from the wind energy installation.

The voltage at the generator-side inverter is primarily dependent on the grid voltage, the installation rotation speed and the reactive current feed from the generator-side inverter. If the voltage of the generator-side inverter rises above a permissible limited, particularly at high rotation speeds and high voltage or when there is a change in the grid frequency, then the wind energy installation is generally shut down. First of all, an attempt is made to counteract this by changing the generator to a more inductive operating point. However, if the voltage reduction produced by the generator-side inverter is not sufficient to achieve a sufficiently low voltage, the grid-side inverter additionally feeds in inductive reactive power in order to further reduce the voltage at the generator-side inverter. Even in the case of a three-winding transformer, as is shown in FIG. 1, the grid-side inverter can make a contribution to reducing the voltage at the generator-side inverter.

However, if the voltage at the generator-side inverter is still too high, the real power output of the doubly-fed asynchronous generator can be reduced. This results in an additional current being available for the reactive current feed both in the generator-side inverter and in the grid-side inverter.

Generally, the reactive current drawn from the generator is compensated for by the generator-side inverter. By way of example, in the case of a 2 MW wind energy installation, this is about 200 MVA or about 100 A. If a high torque is now involved, for example when a wind energy installation is being operated at relatively low rotation speeds, then, in particular in the vicinity of the synchronous point of the generator, this can require the power of the generator-side inverter to be reduced, in order to prevent thermal overloading. This is because the frequency of the generator-side inverter is virtually zero in the region of the synchronous point, as a result of which it is therefore necessary to feed direct currents.

However, these lead to an unequal load on the generator-side inverter, as a result of which individual half-bridges are loaded considerably more severely. In order now to prevent overloading of the generator-side inverter, the current limit for continuous operation is generally reduced close to the synchronous point. If, in particular in the vicinity of the synchronous point, the continuous operation limit for the current output from the generator-side inverter is reached, then the reactive current feed from the generator-side inverter is reduced, as a result of which a greater proportion of the current is available for the real current feed. The proportion of the reactive current which is now missing is provided by the grid-side inverters, as a result of which the reactive power feed of the overall system is not adversely affected. Furthermore, the rotation speed of the wind energy installation is regulated such that it remains only briefly in the vicinity of the synchronous point, in order to avoid a reduction in the real power output.

If the voltages on the three phases in the grid are different, an unbalanced current feed occurs. In consequence, components can be overloaded, and the unbalanced load on the generator can also lead to power fluctuations. In addition, the negative phase sequence system currents in the generator lead to undesirable losses since—particularly in the rotor—the higher current frequency leads to current displacement. In order to avoid such disturbances, wind energy installations with a doubly-fed asynchronous generator are equipped with negative phase sequence control systems, which once again smooth out the current output into the grid. In the case of a wind energy installation with a doubly-fed asynchronous generator, the generator-side inverter provides a negative phase sequence control system for the real currents, in order to minimize the load on the wind energy installation. The control system according to the invention improves this negative phase sequence control system, which is known per se, by the grid-side inverter additionally feeding a negative phase sequence system reactive current (inductive in the negative phase sequence system) in order to reduce the voltage unbalance. The negative phase sequence system voltage reduced in this way stabilizes the grid and, furthermore, has a positive effect on the wind energy installation since, for example, this reduces the negative phase sequence system of the voltage at the drives (pumps, fans, azimuth, . . . ).

The wind energy installation with a doubly-fed asynchronous generator is equipped with a stator switch which makes it possible to continue to feed reactive power into the grid even when the generator-side inverter is shut down. In order to ensure a continuous reactive power feed even while the stator is being connected and disconnected, an operating mode is selected when a defined rotation speed is undershot, in which the compensation for the reactive current drawn by the generator is carried out exclusively by the generator-side inverter, but any further reactive current provision for the grid is provided exclusively by the grid-side inverter. The electrical grid is therefore not subject to any change in the magnitude of the reactive power feed when the stator is being connected or disconnected, for example for continuous voltage regulation or operation as a reactive power source in the grid (STATCOM).

Regulation of the currents via the generator-side inverter normally involves time constants of more than 10 ms, because of the indirect method of operation via the generator. In contrast to this, the regulation time constants of the grid-side inverter can be much less than this, since it operates directly on the electrical grid. In the event of a sudden change in the voltage which is present at the wind energy installation, the real and/or reactive current output must likewise be changed suddenly. On the one hand, this can be justified by the fact that the power output should be kept constant, or on the other hand because the voltage after the sudden voltage change is outside the tolerance, and the grid voltage must be influenced via the reactive current output. The currents are now rapidly regulated taking account of the regulation time constants mentioned above. For regulation of the grid-side inverter, the converter regulator not only takes account of the nominal value but also of the control difference between the nominal and actual values of the generator-side inverter, and adds the control difference to the nominal value of the grid-side inverter. If the generator-side inverter is being operated outside its current limits, or the current rise is not yet sufficient, the current margins of the grid-side inverter are used in order to improve the control rate of the overall system.

One major precondition for this type of control is that the communication between the generator-side inverter and the grid-side inverter is fast, since both the nominal value of the reactive current of the grid-side inverter and the actual value of the reactive current of the overall system are necessary in order to control the grid-side inverter.

In the case of a split control with two completely autonomous regulators for the inverters without a superordinate converter regulator, it is necessary when transferring values to the grid-side inverter, and in order to ensure the necessary control rate, to also transfer the actual value of the reactive current of the generator-side inverter to the regulator for the grid-side inverter, in each computation step.

The wind energy installation with a doubly-fed asynchronous generator has a greater peak short-circuit current than wind energy installations with full-converter systems, in which all of the electrical power flows via the converter. The peak short-circuit current is a current peak which occurs in the event of short circuits in the grid and which is output from the wind energy installation into the grid. A high peak short-circuit current can damage components upstream of the wind energy installation in the grid. The peak short-circuit current can be detected by a current peak at the generator-side inverter. The invention now makes it possible to use a control system in which a portion of the peak short-circuit current is compensated for and/or provided by the grid-side inverter. A peak short-circuit current has reactive current and real current components, in which case the grid-side inverter can compensate for most of the inductive reactive current by feeding a compensating reactive current, that is to say generally a capacitive reactive current. The real current cannot be compensated for as easily. This must be diverted into an electrical load. For this purpose, the grid-side inverter passes the current into the intermediate circuit of the converter. This leads to the voltage of the intermediate circuit rising, and the protection element which is connected in the intermediate circuit of the converter, generally an intermediate circuit chopper with a load resistance, absorbing the energy or at least a portion of the energy in the peak short-circuit current. This type of control allows the peak short-circuit current to be substantially reduced.

The invention claimed is:

1. A method for controlling a converter of a wind energy installation, the converter being connected to a rotor of a doubly-fed asynchronous generator for feeding electrical power into an electrical grid and comprising a generator-side inverter, a grid-side inverter, and at least one converter regulator for regulating, controlling, or both, currents emitted from at least one of the inverters to at least one of the generator and the electrical grid, comprising:
    detecting a change in electrical voltage present in at least one of emitted real currents and emitted reactive currents at one of the inverters;
    determining whether the detected change corresponds to a predetermined change; and
    changing nominal values of at least one of real currents to be emitted and reactive currents to be emitted from the other inverter if the detected change corresponds to the predetermined change.

2. The method of claim 1, wherein the predetermined change is the reaching of a predetermined limit value.

3. The method of claim 1, wherein the maximum nominal value of the reactive currents to be emitted from the other inverter is determined taking account of the emitted real currents and a control margin of the real currents.

4. The method of claim 1, wherein the predetermined change is the reaching of an upper voltage limit value of the voltage which is present at an inverter, and the other inverter increases the reactive current output in order to reduce the voltage which is present at the inverter which has reached the limit value.

5. The method of claim 1, wherein the predetermined change is at least one component in the wind energy installation exceeding a predetermined temperature limit value, which is caused by at least one of the real current and the reactive current output from an inverter, with the component being located in a power strand associated with the inverter.

6. The method of claim 5, wherein the predetermined change is the event sequence exceeding a limit of the current output followed by the exceeding of a temperature limit value.

7. The method of claim 1, wherein a sum of at least one of the reactive or real currents emitted from the inverters to the electrical grid and at least one of the reactive or real powers remains largely unchanged.

8. The method of claim 1, wherein at least one of the reactive or real current emitted is regulated such that a relative load with respect to a maximum current output of the inverters or power strands associated with the inverters is as uniform as possible.

9. The method of claim 1, wherein in the case of a voltage unbalance such that a discrepancy in a voltage which is present at one of the inverters in one phase goes beyond a limit value, the reactive current output of the other inverter is changed so as to reduce the voltage unbalance.

10. The method of claim 1, wherein in the event of a sudden change in a nominal value of the reactive currents to be emitted in total from the wind energy installation to a new, higher nominal value, the converter regulator splits the new nominal values between the generator-side and grid-side inverters such that a sum of new nominal values for the currents of the inverters corresponds to the new nominal value, with as high a proportion as possible of the reactive current to be emitted being produced on the inverter with the higher dynamics, and the nominal value of the inverter with the lower dynamics is a difference between the nominal value of the total reactive power and the nominal value of the reactive power of the inverter with the higher dynamics.

11. The method of claim 10, wherein, after a time period, after reaching a nominal value, or both, the converter regulator changes the nominal values of the inverters in steps such that the inverter with the lower dynamics emits as high a proportion as possible of the reactive currents to be emitted, until a limit value for this inverter is reached, and the nominal value of the inverter with the higher dynamics is a difference between the nominal value of the total reactive power and the nominal value of the reactive power of the inverter with the lower dynamics.

12. A wind energy installation, comprising: a converter connected to a rotor of a doubly-fed asynchronous generator for feeding electrical power into an electrical grid, the converter comprising a generator-side inverter, a grid-side inverter and at least one converter regulator for regulating, controlling, or both currents emitted from at least one of the inverters to at least one of the asynchronous generator and the electrical grid;
    sensors configured to detect electrical voltages which are present at the inverters, real currents which are emitted from the inverters, and emitted reactive currents; and
    a change determining module configured to store predetermined changes and compare the detected electrical voltages, real currents, and emitted reactive currents,
    wherein in the event of a predetermined change in the electrical voltage which is present in at least one of the emitted real currents and the emitted reactive currents at one of the inverters, nominal values which are present at the other inverter for at least one of the emitted real currents and the emitted reactive currents are changed.

13. The wind energy installation of claim 12, wherein the predetermined change is the reaching of a predetermined limit value.

14. The wind energy installation of claim 13, wherein the nominal value for the output of reactive current from the inverter which reaches the predetermined limit value is changed such that the nominal value corresponds to at least one of a reduced output of capacitive reactive current and an increased output of inductive reactive current.

15. The wind energy installation of claim 12, wherein when the change determining module has determined that the voltage which is present at one of the inverters has reached a limit value, the nominal value for the reactive current output at the other inverter is changed such that the nominal value corresponds to an increase in the reactive current output.

16. The wind energy installation of claim 12, wherein the converter regulator uses temperature sensors to determine temperature values of the components in power strands associated with the inverters, and the predetermined change, is at least one component in the wind energy installation exceeding a predetermined temperature limit value, which is caused by at least one of the real current and reactive current output from an inverter, the component being located in the power strand associated with the inverter.

17. The wind energy installation of claim 1, wherein the converter regulator comprises an autonomous inverter regulator for each inverter and an adaptation module transmits at least one of the respective nominal values, actual values, and control errors for at least one of the real currents, reactive currents, and voltages which are present between the inverters.

18. The method of claim 10, wherein the sudden change in the nominal value of the reactive currents occurs as a result of a sudden change in the voltage which is present.

* * * * *